United States Patent Office 2,963,445
Patented Dec. 6, 1960

2,963,445

REACTIVATING PLATINUM CATALYST

William G. Nixon, Westchester, Ill., assignor, by mesne assignments, to Universal Oil Products Company, Des Plaines, Ill., a corporation of Delaware No Drawing. Filed May 29, 1958, Ser. No. 738,853

8 Claims. (Cl. 252—416)

The present application is a continuation-in-part of my co-pending application, Serial No. 595,863, filed July 5, 1956, now abandoned. This invention relates to the reactivation of platinum-containing catalytic composites, and is specifically directed toward the reactivation of platinum-containing catalytic composites through the utilization of particular oxides of nitrogen.

Patinum-containing catalytic composites have attained extensive commercial utility. Industries such as the pharmaceutical, detergent, petroleum, insecticidal, etc., utilize platinum-containing catalysts to promote a multitude of reactions among which are hydrogenation, cyclization, cracking, polymerization, dehydrogenation, dehydrocyclization, sulfonation, oxidation and, to a certain minor extent, hydrocracking and isomerization.

Whatever the industry and reaction, it is extremely essential, for commercial acceptability, that the platinum catalyst exhibits a prolonged capability to perform its intended function, as well as a high degree of activity in promoting the desired reaction or combination of reactions.

After extended periods of use, platinum catalysts usually become deactivated and thereby lose their capability to perform as desired. Deactivation of the catalyst is seldom sudden; most often, deactivation occurs through a gradual decline in activity until such time as the catalyst is no longer active to the necessary and desired degree. Catalyst deactivation may result from any one or a combination of adverse effects. These effects may, in turn, result from substances which are peculiar to a particular catalyst, and which either give rise to a change in the physical state of the components of the catalyst, or result in a loss of said components. Deactivation may also result from the deposition of impurities: these impurities usually take the form of solids which cover the catalytically active centers and surfaces, and shield them from the materials being processed. Quite often, catalyst deactivation is effected simply as a result of an extended period of use: as such, the deactivation generally involves a change in the state of the metal component. This change is usually an increase in crystallite size, a change in oxidation state and/or a change in regard to the association of the metal component with other catalytic components.

The deposition of coke, or other carbonaceous material, is either a direct cause of catalyst deactivation, or exists in conjunction with any of the aforementioned causes of deactivation. A widely utilized method, thought to regenerate a catalyst effectively, which catalyst has been deactivated by the deposition of carbonaceous material and/or any of the hereinbefore causes of deactivation, is to subject the catalyst to burning in an oxygen-containing gas, usually air, at elevated temperatures. It is well known that this method removes effectively the carbonaceous material, and to all visual appearances, produces an active catalyst. However, the degree of activity of the catalyst regenerated in this manner, is quite often less than the activity of the catalyst prior to use. This is due, usually, to the state of the platinum component, which has not been reverted to the original state, and, which may have, in fact, been adversely affected by the oxidation procedure for the removal of the carbonaceous material.

Also, regeneration by burning in an oxygen-containing gas quite often produces substances which are, in and of themselves, inherently detrimental to catalyst activity. For example, the oxidation of carbonaceous materials produces carbon monoxide which is widely known to be a substance having a deactivating action on metal-containing catalysts, being particularly deleterious to platinum-containing composites.

Usually, the catalyst will, after regeneration, function acceptably for a period of time shorter than that experienced with the fresh catalyst. This, of course, necessitates a second regeneration which again produces a catalyst less desirable than the catalyst before regeneration. Each successive regeneration results in a catalyst which exhibits a shorter period of acceptable activity than that exhibited after the preceding regeneration. Eventually, it becomes necessary to replace completely the catalyst, further regeneration not being economically feasible.

The object of the present invention is to provide a method, for the reactivation of a patinum-containing catalyst, which reconstitutes the platinum component, and which will produce a reactivated catalyst having a high degree of activity and possessing the capability to function acceptably for an extended period of time. Another object is to provide a method for reactivating a platinum-containing catalyst which will not result in the removal of the platinum component from the other components employed in the catalyst.

In one embodiment, the present invention relates to a method for reactivating a deactivated platinum component-refractory inorganic oxide catalyst which comprises treating said deactivated catalyst in the presence of halogen with an oxide of nitrogen selected from the group consisting of $N_2O_3$, $NO_2$, $N_2O_5$ and mixtures thereof.

In another embodiment, the present invention relates to a method for reactivating a deactivated platinum component-refractory oxide catalyst which comprises oxidizing said deactivated catalyst in air and thereafter, in the presence of halogen, treating said air-oxidized catalyst with an oxide of nitrogen selected from the group consisting of $N_2O_3$, $NO_2$, $N_2O_5$ and mixtures thereof.

In a specific embodiment, the present invention relates to a method for reactivating a deactivated platinum-alumina-chloride catalyst which comprises oxidizing said catalyst in air at a temperature of from about 300° C. to about 700° C., treating the air-oxidized catalyst with an oxide of nitrogen selected from the group consisting of $N_2O_3$, $NO_2$, $N_2O_5$ and mixtures thereof at a temperature in excess of 25° C., removing said oxide of nitrogen and thereafter subjecting said catalyst to a reducing treatment with hydrogen at a temperature in excess of 25° C.

The method of the present invention affords benefits, heretofore not obtained, to processes for the reactivation of platinum-containing catalytic composites; it is not intended to limit unduly the present invention to those catalysts comprising platinum as the sole catalytically active metallic component. Other metals may be combined with the platinum, particularly metals of the noble-metal family, and include rhodium, ruthenium, tungsten, silver, palladium, titanium, hafnium, gold, rhenium and mixtures of two or more. It is understood that these metallic components, or mixtures thereof, may exist in the elemental state, or in some combined form as the oxide, halide, sulfate, nitrate, etc.

Whatever the metal component, whether platinum, or a combination of platinum and one or more of the metals hereinabove set forth, it is generally composited with a highly refractory inorganic oxide such as alumina, silica, zirconia, silica-alumina, silica-zirconia, silica-alumina-zirconia, silica-thoria, silica-alumina-thoria, alumina-magnesia, silica-alumina-magnesia, etc. Due to its excellent stability characteristics at high temperatures, alumina or alumina-silica is preferred as the carrier material for the other components of the catalyst. It is understood that these refractory inorganic oxides may be made in any suitable manner including separate, successive, or coprecipitation methods of manufacture, or they may be naturally occurring substances such as clays or earths, and may be purified or activated with special treatment.

Typical of the many methods available for the manufacture of platinum-containing catalysts is to prepare a refractory inorganic oxide, such as alumina, through the addition of an alkaline precipitant to a solution of a salt of aluminum. The platinum component may be added in any suitable manner, a typical method being the addition of an alkaline precipitant, such as ammonium hydroxide, to an aqueous solution of a salt of platinum, subsequently commingling this mixture with the alumina. The resulting mixture is then dried at a temperature of from about 200° C. to about 700° C. for a period of from about 2 hours to about 24 hours or more, and is subsequently formed into any desired shape such as pills, powder, or granules, if said alumina is not already in the desired shape. Regardless of the identity of the metal component and refractory inorganic oxide, or the forms thereof, it is understood that the ultimate composite may be made in any suitable manner including separate, successive, or co-precipitation methods of manufacture.

Whatever the method of manufacture, the catalyst so produced, and ultimately deactivated in use, may be reactivated by the process of the present invention. As hereinbefore set forth, the present invention proposes a method for reactivating a deactivated platinum-containing catalyst through specific treatments with $N_2O_3$, $NO_2$, $N_2O_5$ and mixtures thereof. The method will yield a catalyst having a high degree of activity, and increase, thereby, the length of time in which the catalyst is capable of performing as desired.

It is preferred to subject the deactivated catalyst to air oxidation prior to the treatment with one of the hereinbefore stated oxides of nitrogen. Oxidation in an atmosphere of air will remove substantially completely the carbonaceous material deposited upon the catalyst, thereby enhancing the apparent action of the oxide of nitrogen on the metallic component. The pre-oxidation treatment may employ any suitable free-oxygen containing gaseous material; air is preferred because of its natural abundance, and the economical feasibility of its utilization. Preoxidation with air, or any other suitable free-oxygen containing gaseous substance, need not necessarily precede the treatment with one of the aforementioned oxides of nitrogen in those instances where the deactivated catalyst is virtually void of coke and other carbonaceous material. In any case, the method of the present invention will reactivate a deactivated catalyst, and yield a catalyst having a high degree of activity, and an extended period of utility.

It is understood that the oxides of nitrogen may or may not be employed per se. They may be utilized as mixtures comprising two or more, such as $NO_2$ and $N_2O_3$, $N_2O_5$ and $N_2O_4$ (which is an equilibrium form of $NO_2$), etc. Said oxides of nitrogen may be admixed with various diluents such as, but not limited to, air, nitrogen, other inert gases, etc., and as hereinbefore stated, halogen is present. The presence of water is controlled, minor amounts, also appears to be beneficial. Said oxides of nitrogen may result from other compounds and mixtures which either yield the same at reaction conditions, or form them in situ.

The essential feature of the present invention is the presence of halogen during the treatment with the oxide of nitrogen, and such halogen may be a component of the catalyst to be reactivated or may be admixed with the particular oxide of nitrogen employed. The use of chlorine and/or bromine is preferred, although fluorine and iodine may be utilized. Any suitable concentration of halogen, from an amount which yields a marked improvement, to an amount which is uneconomically in excess, may be used. However, it is preferred that said halogen be present in excess of 0.1 percent by weight of the refractory oxide. It is understood that, although the use of any of these halogens will increase the activity resulting from reactivation, the various halogens are not equivalent, and different halogens may be used with different catalysts.

In accordance with the present invention, the halogen may be added in any suitable manner. Said added halogen may be in the elemental state as chlorine gas, or existing as a combined halide such as, but not limited to, HCl, $CCl_4$, and alkyl halides such as ethyl chloride, propyl chloride, methyl chloride, butyl chloride, etc. As hereinabove set forth in a specific embodiment, said halogen may be a component of the catalyst which is to be reactivated. It is further understood that said halogen may comprise mixtures of two or more of the halides, whether as components of the catalyst, or as halogen which is to be added.

To further improve the activity of the catalyst, it is desirable to subject said catalyst to a reducing treatment. Prior to said reducing treatment, it is necessary that the catalyst is stripped of the oxide of nitrogen by being subjected to a sweeping treatment. The sweeping or stripping agent may be any gaseous substance not having a reducing action on said oxide of nitrogen. Suitable sweeping agents include air, nitrogen, carbon dioxide, mixtures of the same, etc. It is essential that said reducing treatment is not effected in the presence of the oxide of nitrogen. Nitric oxide (NO), although an oxide of nitrogen, is excluded due to its reducing action. Nitrous oxide ($N_2O$) has been found to be incapable of reconstituting the metallic component.

The preferred method of reactivating a deactivated catalyst comprising a platinum metal component composited with a refractory oxide such as, for example, a platinum-alumina-chloride catalyst, is to subject said catalyst to air oxidation at a temperature of from about 300° C. to about 700° C., and further to subject said catalyst, at a temperature in excess of 25° C. with an upper limit of from about 800° C. to about 1000° C., to the action of an oxide of nitrogen selected from the group consisting of $N_2O_3$, $NO_2$, $N_2O_5$ and mixtures thereof, following this latter treatment by sweeping the composite with air to remove traces of the oxide of nitrogen, without removing the platinum component, and thereafter subjecting the catalyst to a reducing treatment with hydrogen at a temperature in excess of 25° C. with an upper limit of from about 800° C. to about 1000° C. The preferred method employs a temperature of from about 300° C. to about 700° C. for the oxidation, oxide of nitrogen, sweeping, and reducing treatments. The reducing treatment may be omitted in those instances where, as a normally integral part of the process in which the catalyst is intended for use, said catalyst is first subjected to the action of a suitable reducing agent. It is further understood that the method of this invention may employ either downflow, upflow, or crossflow in a closed vessel, or countercurrent or concurrent flow through a fixed, fluidized, or continuously moving bed of catalyst.

The following examples are introduced to further illustrate the utility of the present invention and are not intended to limit the same to the specific materials and conditions involved.

EXAMPLE I

An alumina carrier material was prepared from a mixture of equal volumes of a 28% by weight solution of hexamethylene tetramine in water, and an aluminum chloride hydrosol containing 12% by weight aluminum and 10.8% by weight chloride. The mixture was formed into spheres, by the oil-drop method, and were washed, dried to a temperature of 650° C. and then calcined at 650° C.

130 grams of the calcined spheres were soaked in 229 milliliters of a water solution of 99 milliliters of chloroplatinic acid containing 9.92 milligrams of platinum per milliliter.

The spheres were then dried at a temperature of 100° C., and oxidized at a temperature of 500° C. The resulting platinum-alumina-chloride catalyst consisted of 0.80% by weight chloride and 0.75% by weight platinum, based on the total weight of the final catalyst.

A sample of the catalyst, made as described above, was divided into two portions. A first portion, to be used as a standard, was subjected to an activity test which consisted of reducing the catalyst in hydrogen at 500° C. and atmospheric pressure, and passing normal heptane over said first catalyst portion at a temperature of 325° C., atmospheric pressure, a liquid hourly space velocity of 2.4 (liquid hourly space velocity is defined as the volume of liquid charged per hour per volume of catalyst within the reaction zone), and in an atmosphere of hydrogen equivalent to an 8:1 molar ratio of hydrogen to normal heptane. The volume percent conversion of normal heptane to toluene under the above conditions is indicative of the activity of the catalyst. The above described activity test was selected intentionally because of its severity, and small improvements in small numbers are, therefore, highly significant. A second portion of the platinum-alumina-chloride catalyst was placed in a furnace tube and brought to a temperature of 500° C. The catalyst was then subjected to the action of a stream of carbon monoxide for a period of one hour.

It has been shown that the use of carbon monoxide as a catalyst deactivator is effective in producing effects which are similar to those experienced by a catalyst which has been deactivated through normal use. Quite often, the carbon monoxide treatment is more severe, and yields a catalyst which is deactivated to a still greater degree.

The furnace tube was cooled and the catalyst therein removed. A portion of the catalyst which was deactivated by carbon monoxide was subjected to the normal heptane activity test as hereinbefore defined. A second portion of the carbon monoxide-deactivated catalyst was subjected to the method of the present invention by being placed in a furnace tube and brought to a temperature of 500° C. A stream of air was passed through the furnace tube at a temperature of 500° C. for a period of about one hour. This was followed by a stream of $NO_2$ at a rate of 50 cc. per minute for a period of about 5 minutes, and further followed by a stream of air at a temperature of 500° C. for a period of one hour to remove traces of $NO_2$. The catalyst was then subjected to a reducing treatment at a temperature of 500° C. in a stream of hydrogen for a period of one hour. The furnace tube was then cooled, the catalyst removed and then subjected to the test for activity as hereinbefore defined.

The results of the activity tests clearly illustrate the benefits derived from employing the present invention. In addition to the activity tests, the untreated, the carbon monoxide-deactivated, and the $NO_2$-treated portions of the platinum-alumina-chloride catalyst were analyzed by X-ray diffraction to determine the crystallite size of the metal component. Also, said portions of catalyst were subjected to an analysis to determine the quantity of carbon monoxide adsorbed under a standard set of conditions. X-ray diffraction and the carbon monoxide absorption analysis are indicative of the relative size of metal component crystallites, and the availability of active centers and surfaces for catalysis, and have been found, therefore, to be a good measure of catalyst activity. High carbon monoxide adsorptivity, and small crystallite size tend to indicate high catalytic activity.

The results of the activity tests, the determinations of crystallite size, and the carbon monoxide adsorption data are shown in the following table:

TABLE I

| | Without Treatment | Deactivated with CO | With $NO_2$ Treatment |
|---|---|---|---|
| Toluene Yield, Vol. Percent | 2.6 | 0.015 | 2.8 |
| Crystallite Size A | 20 | 27 | 15 |
| CO Adsorption, Moles CO/Mol. Pt | 0.75 | 0.05 | 0.86 |

In addition, a distinct color change was observed between the carbon monoxide-deactivated catalyst and the $NO_2$-treated portion. The carbon monoxide-deactivated catalyst, after the air-oxidation treatment, exhibited a grey color, whereas the $NO_2$-treated portion was white. This is significant for it indicates a definite change in the state of the platinum component, which change is believed to indicate a decrease in crystallite size and/or a change in the physical association with other components, and, therefore, a more active catalyst.

EXAMPLE II

A sample of the platinum-alumina-chloride catalyst made as described in Example I, was soaked in a solution of ammonium nitrate: this treatment with ammonium nitrate, serves to effectively remove the chloride from the catalyst. The catalyst sample was then subjected to the deactivating action of carbon monoxide as hereinbefore described in Example I.

A first portion of the carbon monoxide-deactivated catalyst was subjected to the action of $NO_2$ by the method of the present invention. Said first catalyst portion was then subjected to the normal heptane activity test as defined in Example I, which test indicated a 1.7 volume percent yield of toluene. This in itself is a substantial improvement over the toluene yield of the carbon monoxide-deactivated catalyst as indicated in Table I, that of 0.015 volume percent.

A second portion of the carbon monoxide-deactivated catalyst was soaked in an aqueous solution of ammonium chloride: this treatment with ammonium chloride serves to re-deposit the chloride onto the catalyst. Said second catalyst portion was then subjected to the action of $NO_2$ by the method of the present invention. After the $NO_2$ treatment, the catalyst was subjected to the normal heptane activity test as hereinbefore defined. There resulted a toluene yield of 2.8 volume percent which is significantly greater than that yielded by the chloride-free, first deactivated catalyst portion.

EXAMPLE III

A platinum-alumina-chloride catalyst prepared as hereinbefore described in Example I is deactivated by carbon monoxide as hereinbefore described. A portion of the carbon monoxide-deactivated catalyst is treated in accordance with the method of this invention by subjecting said deactivated catalyst to the action of $N_2O_5$ in a furnace tube at a temperature of 500° C. Since at ordinary conditions, $N_2O_5$ is a solid, it is placed in a suitable container and brought to a temperature at which vaporization of the $N_2O_5$ takes place. A stream of any suitable inert gas such as nitrogen, is passed through the container and then into the furnace tube carrying vaporized $N_2O_5$ with it. The catalyst is further subjected to a stream of air at a temperature of 500° C. to remove traces of $N_2O_5$, and thereafter, further subjected to a stream of hydrogen, at a temperature of 500° C. for a period of one hour.

The furnace tube is cooled, and the reactivated catalyst therein is removed. A distinct color change is observed, said color change being indicative of a more active state of the metal component. The catalyst is then subjected to the normal heptane activity test as defined in Example I, the result of which further substantiates the existence of a more active state of the metal component, and, therefore, a more active catalyst composite.

EXAMPLE IV

A platinum-aluminum-chloride catalyst, prepared as hereinbefore described in Example I, is placed in a furnace tube and brought to a temperature of 500° C. The catalyst is then subjected to a stream of carbon monoxide which, as hereinbefore stated, deactivates effectively said catalyst. The deactivated catalyst is then subjected to the method of this invention through the action of $N_2O_3$ introduced into the furnace tube by passing the stream of any suitable inert gas, such as nitrogen, first through a vessel containing arsenic oxide and nitric acid, the reaction of which produces $N_2O_3$, and then into said furnace tube. After a period of about 5 minutes, a stream of air at a temperature of 500° C. is passed through the tube for a period of one hour to remove all traces of $N_2O_3$. Thereafter, said catalyst is subjected to a stream of hydrogen at a temperature of 500° C. for a period of one hour.

The furnace tube is cooled; the reactivated catalyst is removed, and subjected to the activity test as hereinbefore defined in Example I. The results of the activity test show the catalyst to be reactivated, and substantiate the existence of a more active state of the metal component.

The foregoing examples and specification clearly illustrate the several embodiments of the present invention and the benefits afforded the reactivation of a platinum-containing catalytic composite through the utilization thereof.

I claim as my invention:

1. A method for reactivating a deactivated platinum-containing refractory oxide catalyst which comprises oxidizing said deactivated catalyst in air at a temperature of from about 300° C. to about 700° C., thereafter treating the air-oxidized catalyst, at a temperature of from about 25° C. to about 1000° C. in the presence of a halogen in excess of 0.1% by weight, with an oxide of nitrogen selected from the group consisting of $N_2O_3$, $NO_2$, $N_2O_5$ and mixtures thereof, stripping said oxide of nitrogen from said platinum-containing catalyst with a gas not having a reducing action on said oxide of nitrogen, and thereafter subjecting said catalyst to a reducing treatment with hydrogen at a temperature of from about 25° C. to about 1000° C.

2. The method of claim 1 further characterized in that said oxidizing agent comprises $N_2O_3$.

3. The method of claim 1 further characterized in that said oxidizing agent comprises $NO_2$.

4. The method of claim 1 further characterized in that said oxidizing agent comprises $N_2O_5$.

5. The method of claim 1 further characterized in that said refractory oxide comprises alumina.

6. The method of claim 1 further characterized in that said halogen comprises chlorine.

7. The method of claim 1 further characterized in that said halogen comprises bromine.

8. A method for reactivating a deactivated platinum-alumina-chloride catalyst which comprises oxidizing said deactivated catalyst in air at a temperature of from about 300° C. to about 700° C., thereafter treating the air-oxidized catalyst, at a temperature of from about 25° C. to about 1000° C., with an oxide of nitrogen selected from the group consisting of $N_2O_3$, $NO_2$, and $N_2O_5$, removing said oxide of nitrogen by sweeping with air, without removing said platinum, and thereafter subjecting said catalyst to a reducing treatment with hydrogen at a temperature of from about 25° C. to about 1000° C.

References Cited in the file of this patent

UNITED STATES PATENTS

| | | |
|---|---|---|
| 1,678,627 | Jaeger | July 24, 1928 |
| 2,381,659 | Frey | Aug. 7, 1945 |

FOREIGN PATENTS

| | | |
|---|---|---|
| 744,429 | Great Britain | Feb. 8, 1956 |